(12) United States Patent
Lu et al.

(10) Patent No.: US 11,221,442 B2
(45) Date of Patent: Jan. 11, 2022

(54) BACKLIGHT STRUCTURE AND DISPLAY DEVICE

(71) Applicants: BEIJING BOE OPTOELECTRONICS TECHNOLOGY CO., LTD., Beijin (CN); BOE TECHNOLOGY GROUP CO., LTD., Beijing (CN)

(72) Inventors: Yuanda Lu, Beijing (CN); Lu Yu, Beijing (CN); Fei Gao, Beijing (CN); Xuerong Wang, Beijing (CN); Haiwei Sun, Beijing (CN); Xue Dong, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 461 days.

(21) Appl. No.: 16/326,008

(22) PCT Filed: Apr. 25, 2018

(86) PCT No.: PCT/CN2018/084454
§ 371 (c)(1),
(2) Date: Feb. 15, 2019

(87) PCT Pub. No.: WO2019/033782
PCT Pub. Date: Feb. 21, 2019

(65) Prior Publication Data
US 2021/0341666 A1    Nov. 4, 2021

(30) Foreign Application Priority Data
Aug. 15, 2017 (CN) .......................... 201710699626.X

(51) Int. Cl.
*F21V 8/00* (2006.01)

(52) U.S. Cl.
CPC ......... *G02B 6/0073* (2013.01); *G02B 6/0003* (2013.01); *G02B 6/0036* (2013.01); *G02B 6/0055* (2013.01); *G02B 6/0088* (2013.01)

(58) Field of Classification Search
CPC ... G02B 6/0055; G02B 6/0073; G02B 6/0091
See application file for complete search history.

(56) References Cited

U.S. PATENT DOCUMENTS 9,601,659 B2    3/2017  Bour et al.
2006/0208269 A1  9/2006  Kim et al.
(Continued)

FOREIGN PATENT DOCUMENTS

CN    1588201 A    3/2005
CN    1841798 A    10/2006
(Continued)

OTHER PUBLICATIONS

Second Chinese Office Action dated Sep. 18, 2019, received for corresponding Chinese Application No. 201710699626.X.
(Continued)

*Primary Examiner* — Keith G. Delahoussaye
(74) *Attorney, Agent, or Firm* — Kinney & Lange, P.A.

(57) ABSTRACT

A backlight structure is provided in embodiments of the disclosure, including: a base plate; a light guide plate, on a surface of the base plate at a side thereof and having a plurality of through-holes passing therethrough; a plurality of LED chips, on a surface of the base plate at the same side as the light guide plate, each of the plurality of LED chips being located in one-to-one correspondence within one of the plurality of through-holes of the light guide plate; a fluorescent powder filler filling the plurality of through-holes; a plurality of reflecting elements, on a first surface of the light guide plate facing away from the base plate, respectively, and covering the plurality of through-holes (Continued)

which open outwards at the first surface of the light guide plate, respectively; and a plurality of light extracting structures, on the first surface of the light guide plate, respectively, and configured to guide light to exit therefrom.

20 Claims, 5 Drawing Sheets

(56) References Cited

U.S. PATENT DOCUMENTS

| | | |
|---|---|---|
| 2010/0244058 A1 | 9/2010 | Weng et al. |
| 2015/0355505 A1 | 12/2015 | Overes et al. |
| 2018/0219142 A1 | 8/2018 | Chen et al. |

FOREIGN PATENT DOCUMENTS

| | | |
|---|---|---|
| CN | 101655214 A | 2/2010 |
| CN | 102997136 A | 3/2013 |
| CN | 103400921 A | 11/2013 |
| CN | 103700758 A | 4/2014 |
| CN | 104115056 A | 10/2014 |
| CN | 105445994 A | 3/2016 |
| CN | 106098697 A | 11/2016 |
| CN | 107505769 A | 12/2017 |
| TW | 201036202 A | 10/2010 |

OTHER PUBLICATIONS

International Search Report and English Translation of Box V of the Written Opinion dated Apr. 25, 2018, received for corresponding PCT Application No. PCT/CN2018/084454.

BACKLIGHT STRUCTURE AND DISPLAY DEVICE

CROSS-REFERENCE TO RELATED APPLICATION(S)

This application is a Section 371 National Stage Application of International Application No. PCT/CN2018/084454, filed on Apr. 25, 2018, entitled "BACKLIGHT STRUCTURE AND DISPLAY DEVICE", which has not been published yet, which claims priority to Chinese Patent Application Invention No. 201710699626.X filed on Aug. 15, 2017 in the State Intellectual Property Office of China, the whole disclosure of which is incorporated herein by reference

BACKGROUND OF THE DISCLOSURE

Field of the Disclosure

Embodiments of the present disclosure generally relate to the technical field of display technology, but not being limited thereto, and in particular, to a backlight structure and a display device comprising the same.

Description of the Related Art

Relevant backlight structures may for example comprises two types, i.e., a side-lit type backlight and a direct type backlight. In comparison, a relevant side-lit type backlight structure is relatively complex in its own structure, and comprises a limited number of LED chips. Moreover, once it is additionally covered with various film materials (such as brightness enhancement film (abbreviated as BEF) and scattering film and the like), its backlight brightness may be decreased, and then some picture defects such as Moiré patterns, Newton rings, and the like may also be incurred thereby. By contrast, a direct type backlight structure comprises an unrestricted amount of LED chips.

SUMMARY OF THE DISCLOSURE

The embodiments of the present disclosure have been made to overcome or alleviate at least one aspect of the above mentioned disadvantages and/or shortcomings in the prior art, by providing the disclosure.

Following technical solutions are adopted in exemplary embodiments of the invention.

According to one aspect of embodiments of the disclosure, there is provided a backlight structure, comprising: a base plate; a light guide plate, on a surface of the base plate at a side thereof and having a plurality of through-holes passing therethrough; a plurality of LED chips, on a surface of the base plate at the same side as the light guide plate, each of the plurality of LED chips being located in one-to-one correspondence within one of the plurality of through-holes of the light guide plate; a fluorescent powder filler filling the plurality of through-holes; a plurality of reflecting elements, on a first surface of the light guide plate facing away from the base plate, respectively, and covering the plurality of through-holes which open outwards at the first surface of the light guide plate, respectively; and a plurality of light extracting structures, on the first surface of the light guide plate, respectively, and configured to guide light to exit therefrom.

According to an embodiment of the disclosure, each of the plurality of reflecting elements has a width following a formula as below:

$$D \geq d + 2t \cdot \tan\left(\arcsin\frac{1}{n}\right)$$

wherein D is the width of each of the plurality of reflecting elements, d is a diameter or a maximal cross-sectional dimension of each of the plurality of through-holes, t is a thickness of the light guide plate and n is a refractive index of a material of the light guide plate.

According to an embodiment of the disclosure, the width of each of the plurality of reflecting elements is not more than 150 μm.

According to an embodiment of the disclosure, the backlight structure further comprises: a light adjustment structure, within a region on a second surface of the light guide plate abutting against the base plate, which region is illuminated by reflection light rays reflected from the plurality of reflecting elements, and the light adjustment structure being configured to reflect the light rays incident on the second surface from inside of the light guide plate back into the light guide plate.

According to an embodiment of the disclosure, the light adjustment structure comprises a reflecting coating.

According to an embodiment of the disclosure, the light adjustment structure comprise a plurality of projections which are provided on the second surface of the light guide plate and extend inwards the base plate from the second surface, each of the plurality of projections having an inclined surface which is set at an inclined angle ω relative to the second surface of the light guide plate to obtain a total reflection of light rays directing towards the inclined surface, within the light guide plate.

According to an embodiment of the disclosure, each of the plurality of projections is shaped to be a serrated projection.

According to an embodiment of the disclosure, a reflecting coating is provided on an inner surface of each inclined surface of the light adjustment structure facing towards the base plate.

According to an embodiment of the disclosure, the plurality of light extracting structures are hemispherical projections or conical projections.

According to an embodiment of the disclosure, the plurality of light extracting structures has a smaller local distribution density at a region adjacent to the plurality of through-holes than that at a region away from the plurality of through-holes, on the first surface.

According to an embodiment of the disclosure, the plurality of through-holes are distributed evenly across the light guide plate.

According to an embodiment of the disclosure, the base plate is provided with a control circuit thereon, the control circuit electrically connects with the plurality of LED chips.

According to another aspect of the exemplary embodiment of the present disclosure, there is provided a display device, comprising the backlight structure as above.

BRIEF DESCRIPTION OF THE DRAWINGS

The above and other features and advantages of the present disclosure will become more apparent and a more comprehensive understanding of the present disclosure can

DETAILED DESCRIPTION OF PREFERRED EMBODIMENTS

Figure 1:
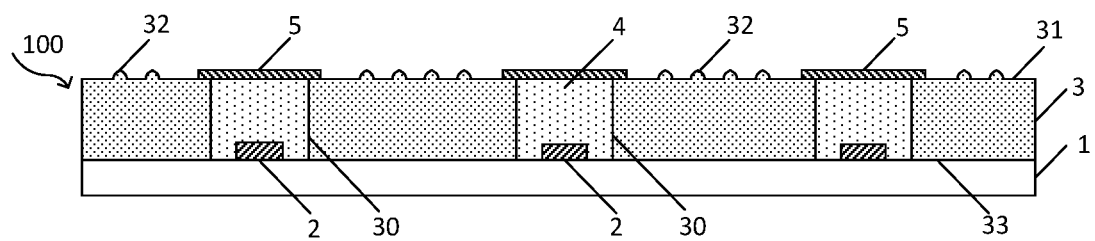
FIG. 1 illustrates a schematic view of a backlight structure according to an exemplary embodiment of the disclosure.

The embodiments of the present disclosure will be described in detail below with reference to the accompanying drawings. It is to be understood that the following description of the embodiments is intended to be illustrative. In the specification and the drawings, the same or similar reference numerals are used to refer to the same or similar components or members. For the sake of clarity, the drawings are not necessarily drawn to scale, and some of the known components and structures may be omitted in the drawings.

Unless otherwise defined, technical or scientific terms used in the present disclosure shall be of ordinary meaning as understood by those skilled in the art. The words "first" "second" and similar terms used in the present disclosure do not denote any order, quantity, or importance, but are used to distinguish different components. The words "a" or "an" don't exclude a plurality. The words "including" or "comprising" and the like, are intended to mean that the elements or items that appear before such words cover the elements or items and the like which are listed after such words and don't exclude other elements or items. The words "connected" or "coupled" and the like are not limited to physical or mechanical connections, but may include electrical connections, regardless directly or indirectly. "Upper", "lower", "left", "right", "top" or "bottom" and the like are only used to indicate relative positional relationship. When absolute position of the object to be described is changed, the relative positional relationship may also be changed correspondingly. When an element such as a layer, a film, a region or a substrate is referred to as being "on", "above" or "below" or "under" another element, the element can be "directly" on or under the other element, or there may be intermediate elements.

FIG. 1 illustrates a schematic view of a backlight structure 100 according to an exemplary embodiment of the disclosure. According to a general inventive concept of embodiments of the present disclosure, in an aspect of the embodiments of the disclosure, as illustrated in FIG. 1, there is provided a backlight structure 100, comprising: a base plate 1, a plurality of LED chips provided on the base plate 1, and a light guide plate 3 provided on the base plate 1. The light guide plate 3 comprises a plurality of through-holes 30. An upper surface of the light guide plate 3, i.e., a first surface 31 facing away from the base plate 1, functions as a light-emergent surface. The plurality of LED chips 2 are provided on a surface of the base plate 1 at the same side as the light guide plate, respectively, and each of the plurality of LED chips is located (for example in one-to-one correspondence) within one of the plurality of through-holes of the light guide plate. As illustrated, each LED chip is located within a regional extent/scope defined by an orthogonal projection of a respective one of the plurality of through-holes 30 of the light guide plate 3 on the base plate 1. The plurality of through holes 30 are filled with a fluorescent powder filler 4. The backlight structure 100 further comprises a plurality of reflecting elements 5, which are provided on the first surface 31 of the light guide plate 3 and cover respective openings of the plurality of through-holes 30 interfacing with the upper surface, at a side facing away from the base plate 1. As illustrated in FIG. 1, the light guide plate 3 further comprises a plurality of light extracting structures 32. Both the plurality of light extracting structures 32 and the plurality of reflecting elements 5 are illustrated to be provided on the first surface 31 of the light guide plate 3 facing away from the base plate 1.

A material of the base plate 1 includes but is not limited to glass or PCB (i.e., printed circuit board), etc. The plurality of LED chips 2 are provided on the base plate 1, e.g., by a package method such as normal chip package, flip chip package, vertical package, and the like. Each of the plurality of LED chips 2 is for example of micro LED type. The plurality of LED chips 2 are arranged evenly on the base plate 1 such that the backlight structure 100 emits backlight uniformly. A control circuit is for example fabricated on the base plate 1, and is electrically connected with the plurality of LED chips, so as to control whether the plurality of LED chips emit light or not. The control circuit is for example an ITO circuit. The ITO circuit is mainly used to connect anodes and cathodes of the plurality of LED chips. By way of example, LED flip chips are mounted to the ITO circuit by reflow soldering. The ITO circuit may for example form a single anode-cathode to control turn-on and turn-off of the backlight structure as a whole; and may also form circuits for controlling turn-on and turn-off of each chip individually so as to implement a more complex functionality, e.g., meeting requirements of HDR (i.e., requirement of high dynamic contrast).

A material of the light guide plate 3 is for example inorganic glass or organic glass. The plurality of through-holes 30 are distributed evenly across the light guide plate 3. Each through-hole 30 has a cross section shape comprising but not limited to round, rectangle, and the like, and has a longitudinal section shape comprising but not limited to straight line, waist, and the like. And it is required that the plurality of through-holes 30 are sized to ensure that the plurality of LED chips 2 are placed therein, respectively.

The light guide plate 3 and the base plate 1 are aligned, assembled and bonded with each other by Optical Clear Adhesive (OCA). During the bonding, it is required to ensure that the plurality of through-holes 30 are aligned with the plurality of LED chips 2, respectively. For example, once the base plate 1 and the light guide plate 3 are bonded together, each of the plurality of LED chips 2 is further positioned at a central region of a regional extent/scope defined by an orthogonal projection of a respective one of the plurality of through-holes 30 on the base plate 1. The light guide plate 3 is for example merely bonded at its peripheral portion thereof to the base plate 1 by OCA, with air gap existing between other portions of the light guide plate 3 and the base plate 1. During a process of bonding the light guide plate 3 and the base plate 1, a thickness of the OCA should be smaller than or equal to a height of a tinned solder bump/ball formed between the LED chips and the control circuit located on the base plate 1 (e.g., aforementioned ITO circuit) when the LED chips are mounted onto the base plate 1 by reflow soldering, so as to prevent light leakage from occurring between the light guide plate 3 and the base plate 1.

The fluorescent powder filler 4 fills the plurality of through-holes 30 of the light guide plate 3 after bonding the light guide plate 3 and the base plate 1, so as to encapsulate the plurality of LED chips 2. A filling height of the fluorescent powder filler 4 within the plurality of through-holes 30 is sized such that a surface of the fluorescent powder filler 4 away from the base plate 1 is flush with the first surface 31 of the light guide plate 3. The fluorescent powder filler 4 is in a form of a liquid filler formed by fluorescent material particles 41 being mixed within a liquid adhesive at an initial stage of the filling thereby, and then is cured in a subsequent curing process into a solid state after the filling is completed. The fluorescent filler 4 is used to convert blue light rays emitted by the LED chips 2 into yellow light rays, and then the yellow light rays are mixed with the blue light rays emitted by the LED chips 2 to produce white light rays which function as the backlight of a display device. The fluorescent material particles 41 comprise but are not limited to a material originating from a group comprising: silicate, YAG (i.e., yttrium aluminum garnet), KSF (a kind of fluoride) and the like; and may further comprise a photoluminescence material such as QD (quantum dot) and the like.

The plurality of reflecting elements 5 may be deposited for example in a form of a reflecting film layer by an evaporation process onto the first surface 31 of the light guide plate 3 facing away from the base plate 1, covering immediately above the plurality of through-holes 30, and may be arranged such that a central line of each of the plurality of reflecting elements 5 coincides with a central line of a respective one of the plurality of through-holes 30. A material of the plurality of reflecting elements 5 comprises but is not limited to a reflective material such as white reflective material, silver reflective material, and the like. The plurality of reflecting elements 150 may for example comprise a plurality of reflecting film layers, each layer being for example formed by a same reflective material or different reflective materials.

The plurality of reflecting elements 5 may mainly shield and reflect light rays in a forward direction of the LED chips 2 (e.g., illustrated to be in a normal upwards direction of the LED chips) so as to increase a proportion of a portion of light rays propagating within the light guide plate 3, so as to enhance luminous efficiency. Each of the plurality of reflecting elements 5 should be sized to have a width larger than a diameter of each of the plurality of through-holes 30 (in a condition that the through-holes 30 are round through-holes) or an equivalent diameter of each of the plurality of through-holes 30 (in a condition that the through-holes 30 are non-round holes), and is shaped for example corresponding to (e.g., similar to or identical to) a shape of each of the plurality of through-holes 30. In a condition that the through-holes 30 are non-round hole, each of the plurality of reflecting elements 5 may also have a non-round shape. And each of the plurality of reflecting elements 5 of non-round shape for example has a shape similar to that of each of the plurality of through-holes 30 of non-round shape, and is arranged to be concentric with each of the plurality of through-holes 30 of non-round shape, for example, is merely scaled up and down equally proportionally to be different sizes. As such, the width of each of the plurality of reflecting elements 5 is for example defined to be a maximal plane dimension of an orthogonal projection of each of the plurality of reflecting elements 5 on the base plate, and the equivalent diameter of each of the plurality of through-holes 30 is for example defined to be a maximal cross section dimension of the orthogonal projection of each of the plurality of through-holes 30 on the base plate. Here, said "forward direction" is defined to be a principal propagation direction of light rays emitted by the LED chips, i.e., a roughly upwards direction as illustrated in FIG. 1 in the embodiment.

As illustrated in FIG. 1, a plurality of light extracting structures 32 are provided on the first surface 31 of the light guide plate 3, respectively, and configured to guide light rays which propagate by total reflection within the light guide plate 3 to exit from the light guide plate 3 through the plurality of light extracting structures 32. An example of the plurality of light extracting structures 32 comprises a plurality of hemispherical projections or conical projections which are integrally formed on the first surface 31 of the light guide plate 3 in a discrete arrangement. By adopting the plurality of hemispherical projections or conical projections, it may be readily to guide light rays from inside of the light guide plate 3. Certainly, each of the plurality of light extracting structures has a shape comprising but not limited to a hemispherical projection or a conical projection, and may have other shape, e.g., a boss having a trapezoidal cross section; or the plurality of light extracting structures 32 may for example be a plurality of recessed mesh grid dots which are concave inwards the first surface 31 of the light guide plate 3. The shape of each of the plurality of light extracting structures may not be restricted as long as light rays may be extracted therethrough from the light guide plate.

The plurality of light extracting structures 32 which are for example hemispherical projections or conical projections may for example be distribute evenly within gaps among the plurality of reflecting elements 5, on the first surface 31 of the light guide plate. As an alternative embodiment, the plurality of light extracting structures 32 may for example be distributed non-uniformly within gaps among the plurality of reflecting elements 5, on the first surface 31 of the light guide plate. Specifically, by way of example, the plurality of light extracting structures 32 has a smaller local distribution density at a region adjacent to the plurality of through-holes 30 than that at a region away from the plurality of through-holes 30, on the first surface 31; in other words, the plurality of light extracting structures 32 have a local distribution density thereof on the first surface 31 increasing radially from the plurality of through-holes in the light guide plate 3 towards the light guide plate 3, therefore facilitating more portions of the light rays which propagate from the light guide plate 3 towards the first surface 31 exiting through the light extracting structures 32 which are arranged more densely at locations of the light guide plate 3 away from the plurality of through-holes 30, as compared with a condition in which the plurality of light extracting structures 32 are distributed evenly on the first surface 31 of the light guide plate 3. At the region adjacent to the plurality of through-holes 30, since light rays propagating in the forward direction of the LED chips 2 are shielded and reflected there, then a relatively strong light intensity of emergent light is thus incurred thereat; and therefore, by setting the local distribution density of the plurality of light extracting structures 32 at the region adjacent to the plurality of through-holes 30 of the light guide plate 3 to be smaller than that at the region away from the plurality of through-holes 30 of the light guide plate 3, a compensation for a phenomenon of a non-uniform distribution of light intensity of emergent light across the entire first surface 31 due to existence of through-holes may thus be implemented substantially, facilitating a uniform distribution of light intensity of emergent light at a light-emergent surface (i.e., the first surface 31 of embodiments of the disclosure) of the light guide plate 3, and in turn facilitating provision of a uniform backlight.

Figure 2:
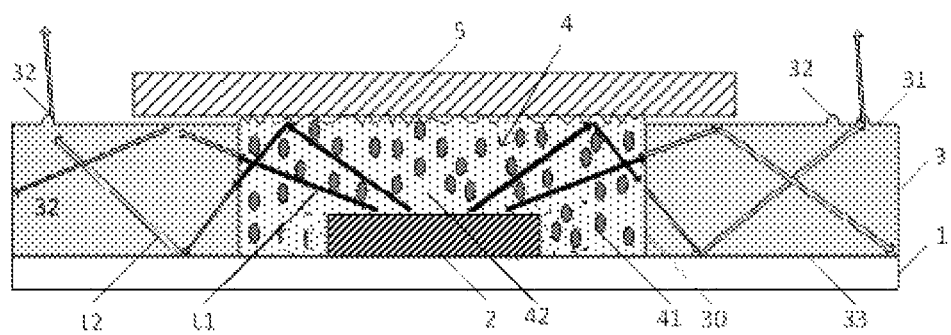
FIG. 2 illustrates a partial enlargement view of the backlight structure as illustrated in FIG. 1.

FIG. 2 illustrates a partial enlargement view of the backlight structure as illustrated in FIG. 1. As illustrated in FIG. 2, blue light rays L1 are emitted by the LED chips 2, and are then excited by the fluorescent powder filler 4 so as to produce yellow light rays which are in turn mixed with the blue light rays so as to produce white light rays L2. Light rays propagating in the forward direction (e.g., the white light rays L2) illuminate the plurality of reflecting elements 5 over the upper side of the plurality of through-holes 30, and are then reflected by the plurality of reflecting elements 5 to be incident onto and to enter the light guide plate 3 along with light rays propagating in other directions. Due to a difference between a refractive index of the light guide plate 3 and that of the medium arranged above the upper surface of the light guide plate, light rays may be reflected inside the light guide plate 3. By way of example, the light guide plate 3 has a larger refractive index than that of a structure (e.g., a layer adjacent to the light guide plate 3; for example the base plate 1) which is in contact with either of the first surface 31 and a second surface 33 (i.e., a lower surface) of the light guide plate 3, such that the light rays may propagate by total reflection within the light guide plate 3 so as to propagate therein, and then uniformly exit outwards through the plurality of light extracting structure 32.

As compared with a condition in which light rays are transmitted upwards directly from LED chips 2, in the backlight structure 100 according to above embodiments of the disclosure, light rays are emitted from the plurality of LED chips 2 and then reflected by the plurality of reflecting elements 5 and then transmitted inside the light guide plate 3, and subsequently exit uniformly and dispersedly from the light-emergent surface of the light guide plate 3 through the plurality of light extracting structures 32. Therefore, as compared with another condition in which light rays are transmitted upwards directly from the LED chips, the backlight structure 100 according to above embodiments of the disclosure may decrease a thickness and decrease its power consumption of the backlight structure, and enhance uniformity of backlight.

Figure 3:
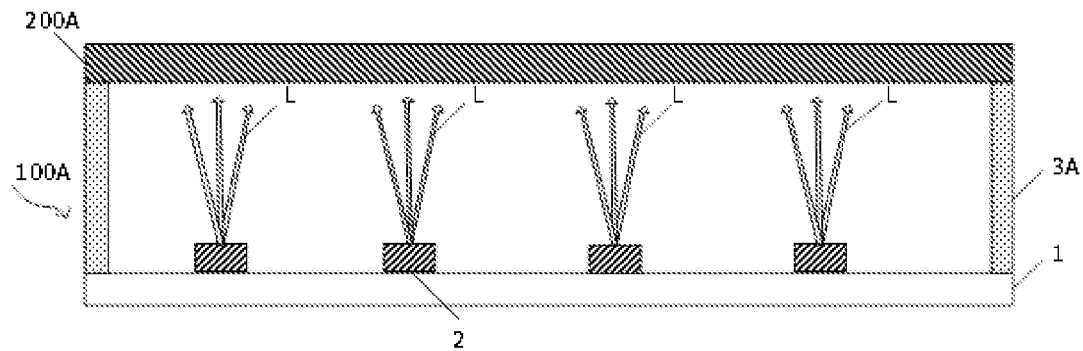
FIG. 3 illustrates a schematic view of a backlight structure which functions as a comparison example for comparison with the backlight structure as illustrated in FIG. 1.

For facilitating a more readily understanding, FIG. 3 illustrates a schematic view of a backlight structure 100A which functions as a comparison example, in which a display panel 200A is illustrated. As illustrated in FIG. 3, the backlight structure 100A comprises a base plate 1, a plurality of LED chips 2 provided on the base plate 1, and a supporting frame 3A which is provided between the display panel 200A and the base plate 1 and surrounds the plurality of LED chips 2 at a periphery thereof. As illustrated in FIG. 3, light rays L emitted from the plurality of LED chips 2 pass through a regional extent/scope defined by the supporting frame 3A and between the display panel 200A and the base plate 1 and transmit upwards, and in turn direct towards the display panel 200A. On one hand, due to a fact that the light rays emitted by the plurality of LED chips 2 are relatively concentrated, then, in order to spread emergent light rays sufficiently so as to provide a uniform backlight for the display panel 200A, the supporting frame 3A may have a relatively large thickness such that the backlight structure 100A may in turn have a relatively large thickness. As such, a display device which comprises both the backlight structure 100A and the display panel 200A may also have a relatively large thickness. On the other hand, if it is desired to decrease the thickness of the backlight structure, more LED chips 2 are required to be provided densely, resulting in a largely increased power consumption of the backlight structure.

In comparison, according to above embodiments of the disclosure, as illustrated in FIG. 2, the light rays which are emitted from the LED chips 2 may above all propagate inside the light guide plate 3 and then exit uniformly and dispersely through the plurality of light extracting structures 32. Since the light rays propagate by total reflection inside the light guide plate 3 so as to be sufficiently dispersed, and are in turn extracted therefrom, then, the light guide plate 3 may not necessarily have a too large thickness, facilitating a uniform backlight. Therefore, there may be a decreased number of LED chips 2, which also decrease power consumption.

Figure 4:
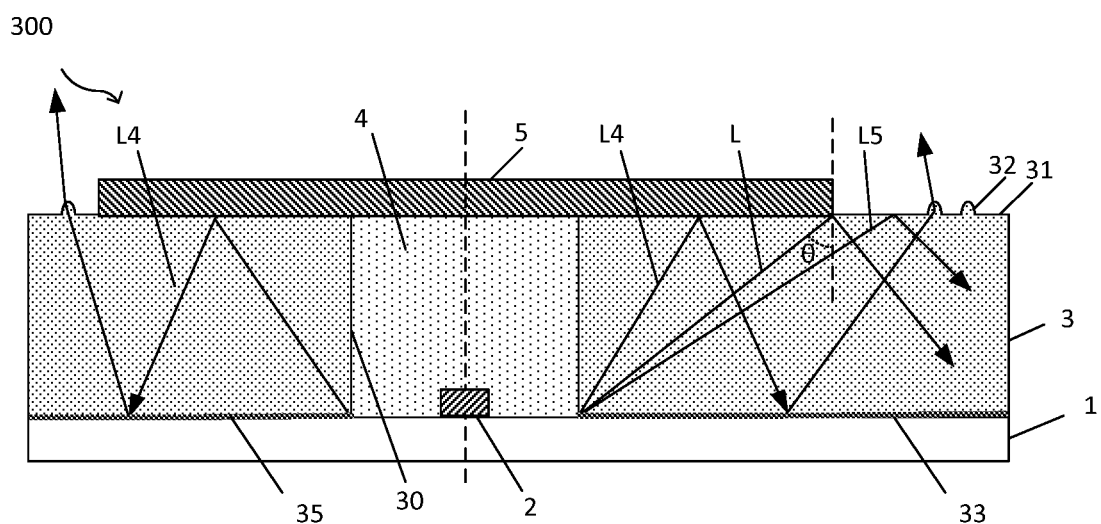
FIG. 4 illustrates a schematic view of a propagation path of light rays propagating within the backlight structure as illustrated in FIG. 1.

FIG. 4 illustrates a schematic view of a propagation path of light rays propagating within the backlight structure as illustrated in FIG. 1. As illustrated in FIG. 4, in order to ensure that a portion of light rays (e.g., light rays L5) which are emitted by the LED chips 2 and fail to be reflected by the reflecting elements 5 may propagate by total reflection inside the light guide plate 230, then, incident light rays L directing from lowermost outer edges of the through-holes 30 towards outer edges of the reflecting elements 5 may have an incidence angle θ being equal to a critical angle of total reflection. As to light rays which have incidence angle larger than the critical angle of total reflection, e.g., light rays L5, they may all propagate by total reflection inside the light guide plate 230. Once the light rays which propagate by total reflection reach the light extracting structures 32, they may exit from the light-emergent surface of the light guide plate 3 through the light extracting structures 32, for providing a uniform backlight.

Provided that the medium disposed above the light guide plate 3 is air having a refractive index of 1, and the light guide plate 3 has a refractive index of n, then the critical angle θ of total reflection may meet a formula as below:

$$\sin\theta = \frac{1}{n}$$

Depending on triangular relation, a radius of each of the plurality of reflecting elements 5 should at least be d/2+t·tan θ; i.e., the width D of each of the plurality of reflecting elements 5 may meet a formula as below:

$$D \geq d + 2t \cdot \tan\left(\arcsin\frac{1}{n}\right) \quad (1)$$

Wherein, D is the width of each of the plurality of reflecting elements 5, i.e., a maximal plane dimension; d is a diameter or a maximal cross section dimension of each of the plurality of through-holes 30; t is the thickness of the light guide plate 3; n is a refractive index of material of the light guide plate 3.

Once above formula (1) is met, then, a portion of light rays (e.g., light rays L5) which fail to be reflected by the reflecting elements 5 may propagate inside the light guide plate 3 by total reflection therein, rather than exiting from the first surface 31 of the light guide plate 3, since the incidence angle thereof may be larger than the critical angle θ of total reflection θ. Once the light rays after total reflection reach the light extracting structures 32, a condition of total reflection is destroyed such that the light rays may exit from the first surface 31 (i.e., the light-emergent surface) of the light guide plate 3. As such, the light rays emitted by the LED chips 2 may above all propagate inside the light guide plate 3 by total reflection, and in turn exit from the first surface 31 of the light guide plate 3 dispersedly. Since the light rays may propagate by total reflection several times inside the light guide plate 3 and then are sufficiently dispersed, and in turn exit therefrom, then not only a uniform backlight may be obtained, but also the light guide plate 3 needs not have a too large thickness. Therefore, there may also be a decreased number of LED chips 2, which also decrease power consumption.

As illustrated in FIG. 4, a portion of light rays emitted by the LED chips 2, e.g., light rays L4, may be reflected by the reflecting elements 5 and then irradiated onto the second surface 33 of the light guide plate 3. In order to take advantage of this portion of light rays, by way of example, a light adjustment structure 35 may be provided on the second surface 33 of the light guide plate 3. The light adjustment structure 35 is provided within a region on a second surface 33 of the light guide plate 3 abutting against the base plate 1, which region is illuminated by reflection light rays reflected from the plurality of reflecting elements 5, and the light adjustment structure 35 is configured to reflect the light rays incident on the second surface from inside of the light guide plate back into the light guide plate, so as to prevent the light rays from exiting from the second surface of the light guide plate. The light adjustment structure 35 is for example in a form of a reflecting coating 35 being applied onto the second surface 33 of the light guide plate 3. As such, according to the embodiment, the light rays reflected from the reflecting elements 5 may for example exit from the first surface 31 of the light guide plate 3 after being reflected upwards by the reflecting coating 35, thus enhancing utilization rate of the light rays.

Please be noticed that, since the reflecting elements 5 may prevent light rays from exiting, then, there may be dark spots appearing at locations where the reflecting elements 5 are provided. However, since the reflecting elements 5 merely occupy a very small portion of the area of the first surface of the light guide plate, then most of the light rays may exit from the gaps among the plurality of reflecting elements 5. Therefore, the uniformity of emergent light rays may not be influenced by the reflecting elements 5. However, in order to further decrease the effects of the reflecting elements 5, by way of example, the reflecting elements 5 are set to be sufficiently small such that the dark spot caused by the reflecting elements 5 may not be readily observed by human eyes. For example, depending on definition of resolution of human eyes, i.e., in a condition of a distance of distinct vision of 25 cm in optics, a distance which may be identified by human eyes may be on an order of approximately 100 μm. To this end, the width D of each of the plurality of reflecting elements 5 may for example meet the following relation:

$$D \leq 150 \ \mu m$$

In such a condition, any effect being applied by the reflecting elements 5 on emergent light rays may for example be further diminished or eliminated, so as to ensure that the backlight structure may provide an uniform backlight.

As stated above, according to above embodiments of the disclosure, a relatively thin backlight structure may be obtained so as to get a uniform backlight and to decrease power consumption of the backlight structure. In a condition that the backlight structure is used for a display device, then the display device may have a decreased thickness and a lowered power consumption, as well as an enhanced picture quality thereof.

Figure 5A:
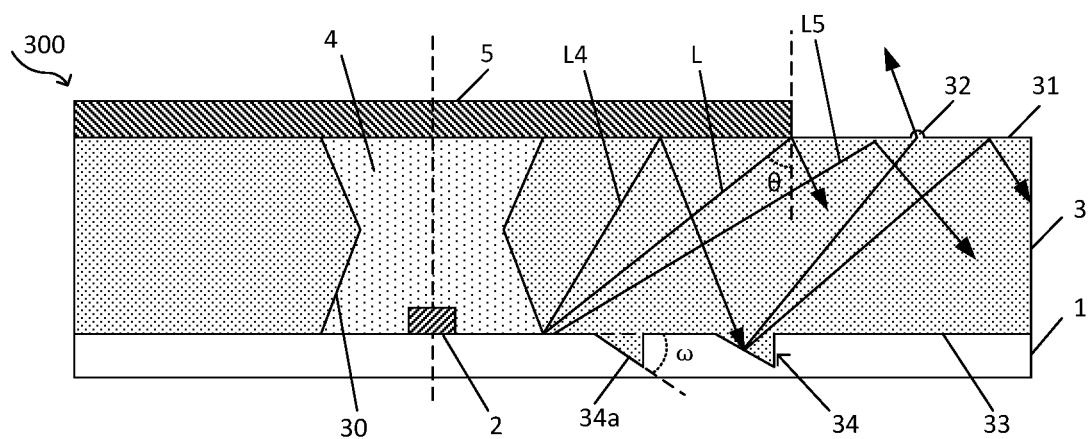
FIG. 5A illustrates a schematic view of a backlight structure according to another embodiment of the disclosure.

FIG. 5A illustrates a schematic view of a backlight structure 300 according to another embodiment of the disclosure. As illustrated in FIG. 5A, the backlight structure 300 comprises a base plate 1, a plurality of LED chips 2 provided on the base plate 1, and a light guide plate 3. A first surface 31 of the light guide plate 3 facing away from the base plate 1 functions as a light-emergent surface. The light guide plate 3 comprises a plurality of through-holes 30. The plurality of LED chips 2 are located within a regional extent/scope defined by an orthogonal projection of the plurality of through-holes 30 on the base plate 1, respectively. The plurality of through-holes 30 are filled with a fluorescent powder filler 4. The backlight structure 300 further comprises a plurality of reflecting elements 5 covering the plurality of through-holes 30 which open outwards at the first surface of the light guide plate, respectively. The backlight structure 300 further comprises a plurality of light extracting structures 32. The plurality of light extracting structures 32 and the plurality of reflecting elements 5 are provided on the first surface 31 of the light guide plate 3 facing away from the base plate 1. Each of the plurality of light extracting structures 32 is in the form of hemispherical projection.

The backlight structure 300 of the embodiment is substantially structured similar to the backlight structure 100 as illustrated in FIG. 1, only differing in that, as illustrated in FIG. 5A, a longitudinal section of each of the plurality of through-holes 30 is in a form of waist shape which has a smaller cross section dimension at a central portion thereof than that at both ends thereof, i.e., having a gradually tapered cross section from both ends thereof toward the central portion thereof. In addition, the light adjustment structure for example comprises a structure 34 which is located at a lower surface of the light guide plate 3, i.e., provided at the second surface 33 thereof adjacent to the base plate 1, and configured to prevent light rays from exiting from the second surface 33 of the light guide plate 3. The structure 34 is for example provided on the second surface 33 of the light guide plate 3, as illustrated, within a region which is illuminated by light rays reflected from the plurality of reflecting elements 5. Other aspects of the embodiment may be the same as those of the embodiment as illustrated in FIG. 1, without being repeated herein any more.

According to a specific embodiment, as illustrated in FIG. 5A, the structure 34 comprises a plurality of serrated projections which are provided on the second surface 33 of the light guide plate 3 and extend inwards the base plate 1 from the second surface 33, each of the plurality of serrated projections having an inclined surface 34a which is configured to reflect the light rays incident on the inclined surface 34a from inside of the light guide plate 3 back into the light guide plate 3, so as to prevent light loss and to enhance luminous efficiency of the backlight structure 300. It may easily be understood by those skilled in the art that, the specific form of the structure may not be limited to serrated projections, and may be any structure which is capable of preventing light rays from exiting from the second surface 33 of the light guide plate 3 as appropriate.

By way of example, according to an exemplary embodiment, a reflecting coating may further be provided for example at a surface of the structure 34 external to the light guide plate 3, i.e., on an inner surface of each inclined surface 34a of the light adjustment structure 35 facing towards the base plate, so as to further prevent light rays from exiting from the second surface 33 of the light guide plate 3 and to enhance luminous efficiency.

In order to further enhance luminous efficiency of the backlight structure 300, according to a specific embodiment, as illustrated in FIG. 5A, each inclined surface 34a is set at an inclined angle ω relative to the second surface 33 of the light guide plate 3, such that the light rays directing towards the inclined surface 34a may propagate by total reflection within the light guide plate 3.

As illustrated in FIG. 5A, on one hand, light rays L5 are incident on the first surface 31 of the light guide plate 3 at an incidence angle larger than the critical angle of total reflection θ and then propagate by total reflection d there, so as to propagate inside the light guide plate 3, and in turn to exit from the first surface 31 of the light guide plate 3 through the light extracting structures 32. On the other hand, light rays L4 which are incident on the reflecting elements 5 are reflected by the reflecting elements 5 to illuminate the inclined surfaces 34a of the structure 34, and for example propagate by total reflection at the inclined surfaces 34a, so as to propagate inside the light guide plate 3 and in turn to exit from the first surface 31 of the light guide plate 3 through the light extracting structures 32.

With the backlight structure 300 according to the embodiment of the disclosure as illustrated in FIG. 5A, the light rays emitted by the LED chips 2 may almost all propagate inside the light guide plate 3, and then exit dispersedly from the first surface 31 of the light guide plate 3 through the light extracting structures 32. Therefore, light loss may be prevented, so as to further enhance luminous efficiency of the backlight structure and to provide uniform backlight for the display device.

Figure 6A:
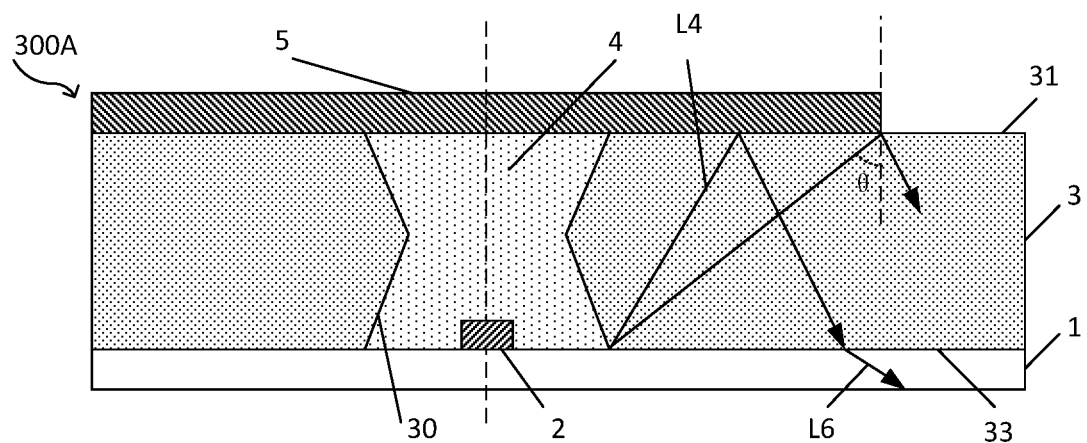
FIG. 6A illustrates a schematic view of a backlight structure which functions as a comparison example for comparison with the backlight structure as illustrated in FIG. 5A.

For facilitating illustration, FIG. 6A illustrates a schematic view of a backlight structure 300A which functions as a comparison example for comparison with the backlight structure as illustrated in FIG. 5A. The backlight structure 300A as illustrated in FIG. 6A differs from the backlight structure 300 as illustrated in FIG. 5A merely in that, as illustrated in FIG. 6A, no optical micro structure is provided on the second surface 33 of the light guide plate 3. As illustrated, in the backlight structure 300A as illustrated in FIG. 6A, light rays L4 reflected by the reflecting elements 5 illuminate the second surface 33 of the light guide plate 3; and at the second surface 33, a portion of the light rays L6 are refracted inside the base plate 1 and thus may not be utilized, resulting in a light loss.

Figure 5B:
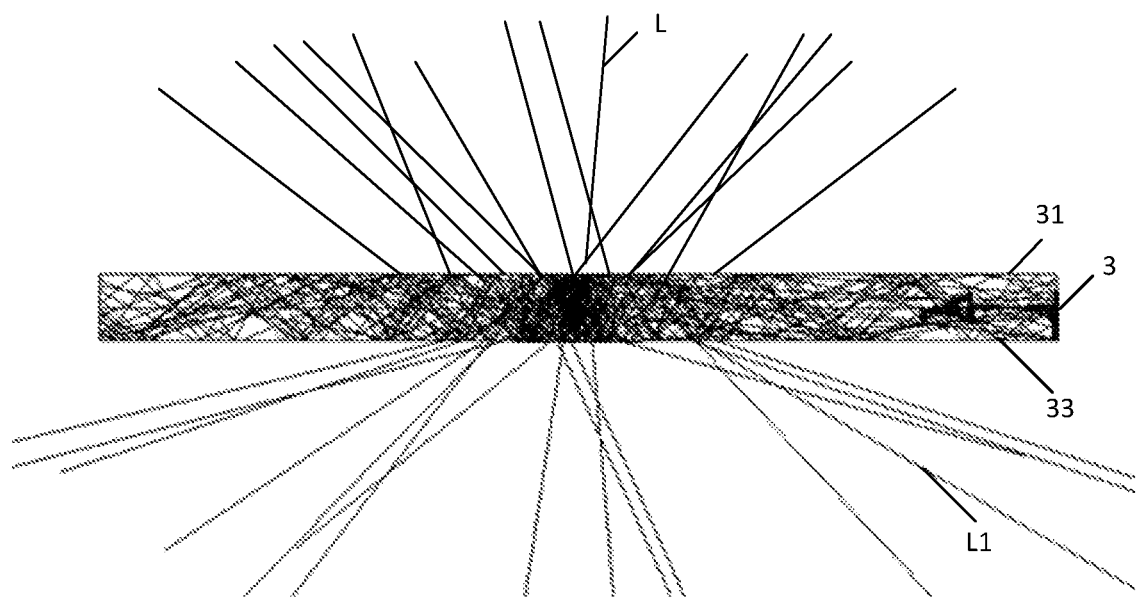
FIG. 5B illustrates a result of an optical simulation of a light guide plate within the backlight structure as illustrated in FIG. 5A.
Figure 6B:
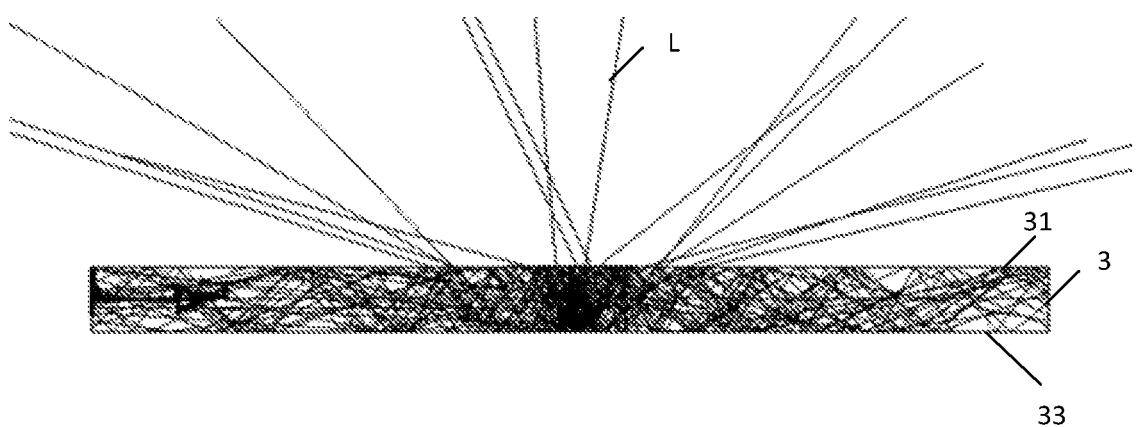
FIG. 6B illustrates a result of an optical simulation of a light guide plate within the backlight structure as illustrated in FIG. 6A.

FIG. 5B and FIG. 6B illustrate results of optical simulations of a light guide plate 3 within the backlight structure as illustrated in FIG. 5A and FIG. 6A, respectively. FIG. 5B is an optical path diagram of a light guide plate 3 without any optical micro structure. FIG. 6B is an optical path diagram of a light guide plate 3 provided with an optical micro structure. As illustrated in FIG. 5B, in the light guide plate 3 having no optical micro structure, a considerable proportion of light rays L1 may leak from the second surface 33 of the light guide plate 3. In comparison, as illustrated in FIG. 6B, by providing an optical micro structure 34 at the second surface 33 of the light guide plate 3, the light rays L almost all exit from the first surface 31 of the light guide plate 3, with hardly any light leakage at the second surface 33 of the light guide plate 3.

Figure 7A:
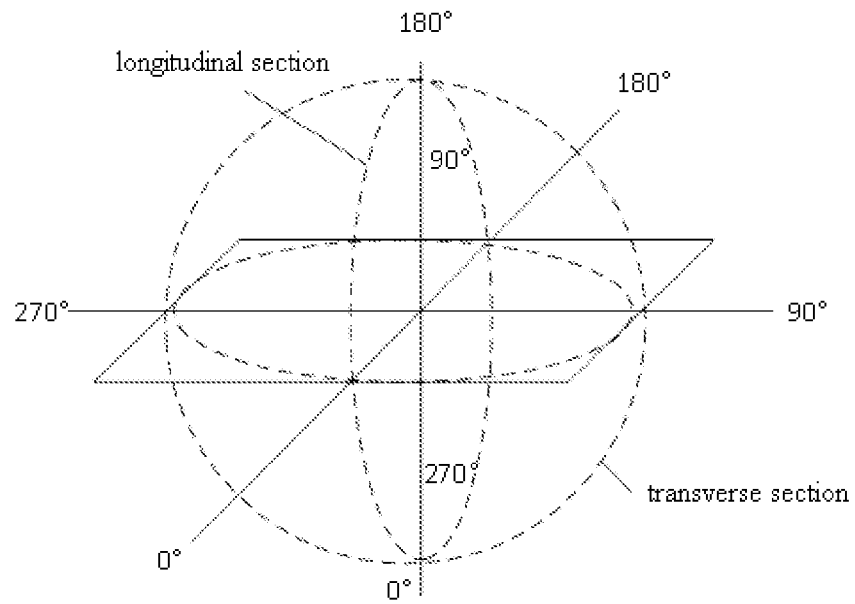
FIG. 7A illustrates a coordinate system adopted for an optical simulation of the backlight structure as illustrated in FIG. 5A.
Figure 7B:
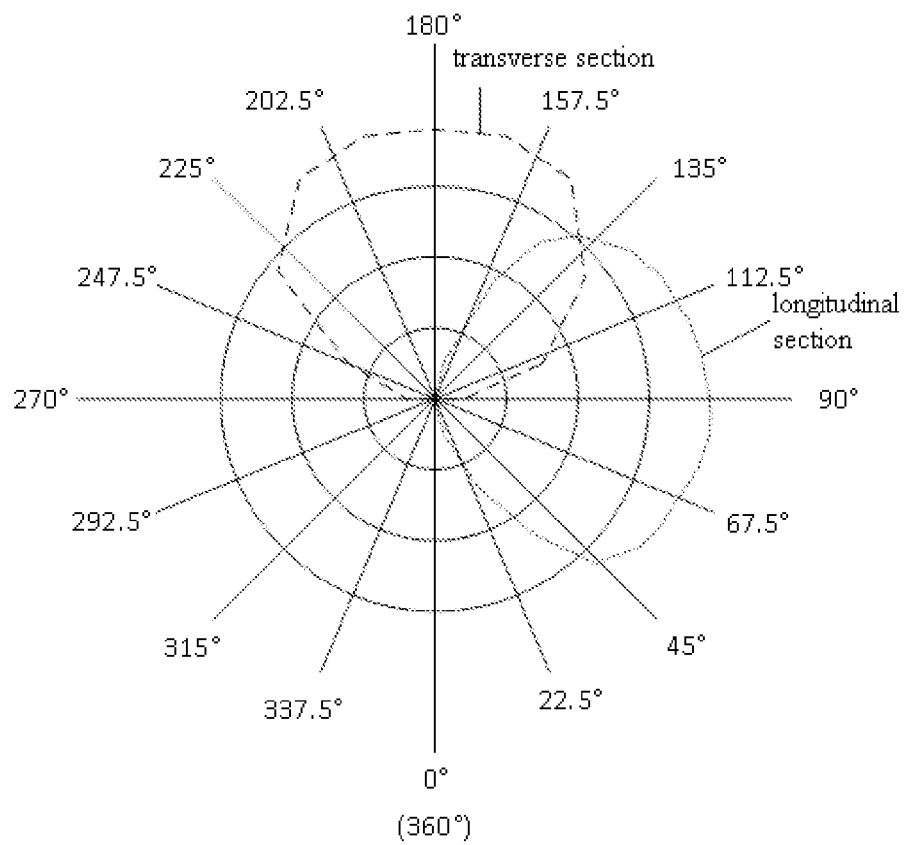
FIG. 7B illustrates a result of an optical simulation of the backlight structure as illustrated in FIG. 5A, by using the coordinate system as illustrated in FIG. 7A.

FIGS. 7A and 7B illustrate an optical simulation of the backlight structure 300 as illustrated in FIG. 5A. The simulation uses Light Tools® software, which utilizes a coordinate system as illustrated in FIG. 7A. In the coordinate system, a plane of the light guide plate is defined as a horizontal coordinate plane; a center point of the light guide plate is defined as an origin of coordinates; and in a direction perpendicular to the plane of the light guide plate, a section passing through the origin of coordinates and parallel to a long side of the light guide plate is defined as a cross section, and another section passing through the origin of coordinates and perpendicular to the long side of the light guide plate is defined as a longitudinal section. In the cross section, a direction perpendicular to the plane of the light guide plate and directing to a front face of the light guide plate from the origin is defined to be a 180° direction; and in the longitudinal section, a direction perpendicular to the plane of the light guide plate and directing to the front face of the light guide plate from the origin is defined to be a 90° direction. Therefore, a straight connection line between 0° direction and 180° direction of the cross section substantially coincides with a straight connection line between 90° direction and 270° direction of the longitudinal section. Here, the front face of the light guide plate refers to a side of the light guide plate providing backlight to the display device.

On the basis of the coordinate system, an optical simulation is carried out on the backlight structure 300 as illustrated in FIG. 5A. Results of the simulation are illustrated in FIG. 7B, wherein a center of circle of concentric rings refers to a luminance (or brightness) of 0, rings having identical radius refer to an iso-luminance line (i.e., isobrightness line; in other words, connecting lines of locations having identical luminance/brightness), and rings having larger radius may refer to an even larger luminance/brightness. As can be known from distribution of luminance of emergent light of the cross section and the longitudinal section, most of the emergent light rays of the backlight structure 300 have their emergence angles of about ±45°, i.e., luminance of light rays exiting from the front face of the entire backlight structure 300 may meet requirements of normal display, thus verifying feasibility of the solution.

With the backlight structures according to embodiments of the disclosure, device structures may be thinned at a large extent, and uniformity of backlight of the entire backlight source may also be ensured. Moreover, the backlight structures of the embodiments of the disclosure may omit several film materials such as brightness enhancement film, backlight film and the like, and thus simplify the backlight structure; and also prevent some picture defects such as Moiré patterns, Newton rings, and the like. In addition, with the backlight structures of the embodiments of the disclosure, there may be a less LED chips in use, with an increased luminous efficiency and a lowered power consumption of the backlight structure.

In another aspect of embodiments of the disclosure, there is further provided a display device, comprising the backlight structure as in above embodiments. Examples of the display device for example comprise products having display functionality, such as, cellphone, television, computer display, tablet computer, laptop computer, digital photo frame, personal digital assistant, navigator, and the like, without being restricted herein. The display device according to the embodiment of the disclosure adopts the backlight structure as in above embodiments, thus has a relatively thin thickness, relatively low power consumption, and a uniform display picture.

By way of example, the display device further comprises a screen which is arranged to be aligned with and assembled with the backlight structure and faces towards an observer.

As compared with relevant art, embodiments of the disclosure have beneficial effects as below:

According to embodiments of the disclosure, relatively thin backlight structure and display device may be obtained, with uniform backlight and enhanced picture quality of the display device.

Although various embodiments of the present disclosure have been described above with reference to the drawings, those skilled in the art will understand that different embodiments may be combined or partially substituted without causing a conflict. Various modifications and variation may be made to the embodiments of the present disclosure without departing from the scope of the invention. All such modifications and variations are intended to fall within the scope of the present disclosure. Therefore, the protection scope of the present disclosure should be determined by those defined by the claims.

What is claimed is:

1. A backlight structure, comprising:
a base plate;
a light guide plate, on a surface of the base plate at a side thereof and having a plurality of through-holes passing therethrough;
a plurality of LED chips, on a surface of the base plate at the same side as the light guide plate, each of the plurality of LED chips being located in one-to-one correspondence within one of the plurality of through-holes of the light guide plate;
a fluorescent powder filler filling the plurality of through-holes;
a plurality of reflecting elements, on a first surface of the light guide plate facing away from the base plate, respectively, and covering the plurality of through-holes which open outwards at the first surface of the light guide plate, respectively; and
a plurality of light extracting structures, on the first surface of the light guide plate, respectively, and configured to guide light to exit therefrom.

2. The backlight structure according to claim 1, wherein each of the plurality of reflecting elements has a width following a formula as below:

$$D \geq d + 2t \cdot \tan\left(\arcsin\frac{1}{n}\right)$$

wherein D is the width of each of the plurality of reflecting elements, d is a diameter or a maximal cross-sectional dimension of each of the plurality of through-holes, t is a thickness of the light guide plate and n is a refractive index of a material of the light guide plate.

3. The backlight structure according to claim 2, wherein the width of each of the plurality of reflecting elements is not more than 150 μm.

4. The backlight structure according to claim 1, further comprising: a light adjustment structure, within a region on a second surface of the light guide plate butting against the base plate, which region is illuminated by reflection light rays reflected from the plurality of reflecting elements, and the light adjustment structure being configured to reflect the light rays incident on the second surface from inside of the light guide plate back into the light guide plate.

5. The backlight structure according to claim 4, wherein the light adjustment structure comprises a reflecting coating.

6. The backlight structure according to claim 4, wherein the light adjustment structure comprise a plurality of projections which are provided on the second surface of the light guide plate and extend inwards the base plate from the second surface, each of the plurality of projections having an inclined surface which is set at an inclined angle ω relative to the second surface of the light guide plate to obtain a total reflection of light rays directing towards the inclined surface, within the light guide plate.

7. The backlight structure according to claim 6, wherein each of the plurality of projections is shaped to be a serrated projection.

8. The backlight structure according to claim 6, wherein a reflecting coating is provided on an inner surface of each inclined surface of the light adjustment structure facing towards the base plate.

9. The backlight structure according to claim 1, wherein the plurality of light extracting structures are hemispherical projections or conical projections.

10. The backlight structure according to claim 9, wherein the plurality of light extracting structures has a smaller local distribution density at a region adjacent to the plurality of through-holes than that at a region away from the plurality of through-holes, on the first surface.

11. The backlight structure according to claim 1, wherein the plurality of through-holes are distributed evenly across the light guide plate.

12. The backlight structure according to claim 1, wherein the base plate is provided with a control circuit thereon, the control circuit electrically connects with the plurality of LED chips.

13. A display device, comprising the backlight structure according to claim 1.

14. The backlight structure according to claim 2, further comprising: a light adjustment structure, within a region on a second surface of the light guide plate abutting against the base plate, which region is illuminated by reflection light rays reflected from the plurality of reflecting elements, and the light adjustment structure being configured to reflect the light rays incident on the second surface from inside of the light guide plate back into the light guide plate.

15. The backlight structure according to claim 3, further comprising: a light adjustment structure, within a region on a second surface of the light guide plate abutting against the base plate, which region is illuminated by reflection light rays reflected from the plurality of reflecting elements, and the light adjustment structure being configured to reflect the light rays incident on the second surface from inside of the light guide plate back into the light guide plate.

16. A display device, comprising the backlight structure according to claim 2.

17. A display device, comprising the backlight structure according to claim 4.

18. A display device, comprising the backlight structure according to claim 9.

19. A display device, comprising the backlight structure according to claim 11.

20. A display device, comprising the backlight structure according to claim 12.

\* \* \* \* \*